United States Patent
Liu et al.

(10) Patent No.: US 9,479,015 B2
(45) Date of Patent: Oct. 25, 2016

(54) SEGMENTED MOTOR STATOR WITH OUTER FIXING RING

(75) Inventors: Bao Ting Liu, Shenzhen (CN); Xiao Peng Ma, Shenzhen (CN); Arunkumar Subramanian, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 807 days.

(21) Appl. No.: 13/337,603

(22) Filed: Dec. 27, 2011

(65) Prior Publication Data

US 2012/0175995 A1    Jul. 12, 2012

(30) Foreign Application Priority Data

Jan. 6, 2011    (CN) .................... 2011 2 0005916 U

(51) Int. Cl.
*H02K 1/14* (2006.01)
*H02K 15/02* (2006.01)
*H02K 1/18* (2006.01)

(52) U.S. Cl.
CPC ................ *H02K 1/148* (2013.01); *H02K 1/18* (2013.01); *H02K 15/02* (2013.01)

(58) Field of Classification Search
CPC .............................. H02K 1/141; H02K 1/148
USPC ..................................... 310/216.135, 216.136
See application file for complete search history.

(56) References Cited

U.S. PATENT DOCUMENTS

| | | | |
|---|---|---|---|
| 5,729,072 A * | 3/1998 | Hirano et al. ......... | 310/216.009 |
| 6,960,860 B1 * | 11/2005 | DeCristofaro et al. ................. | 310/216.113 |
| 2002/0008434 A1 * | 1/2002 | Akutsu et al. ............... | 310/216 |
| 2004/0000837 A1 * | 1/2004 | Suzuki et al. ............... | 310/254 |
| 2005/0082921 A1 * | 4/2005 | Schurter et al. ................ | 310/58 |
| 2009/0273245 A1 * | 11/2009 | Endo et al. ..................... | 310/44 |
| 2011/0115317 A1 * | 5/2011 | Stark et al. ..................... | 310/71 |
| 2013/0276297 A1 * | 10/2013 | Kurosaki ........................ | 29/596 |

* cited by examiner

*Primary Examiner* — Burton Mullins
(74) *Attorney, Agent, or Firm* — Muncy, Geissler, Olds & Lowe, P.C.

(57) ABSTRACT

A motor stator includes a plurality of separate core segments, a plurality of coils, and a fixing ring. Each core segment includes a yoke and a tooth extending from the yoke. The yokes are connected to form a substantially circular core, with the teeth extending inwards. Each coil is wound around a corresponding tooth. The fixing ring is fixed to the outer surface of the core.

13 Claims, 6 Drawing Sheets

SEGMENTED MOTOR STATOR WITH OUTER FIXING RING

CROSS REFERENCE TO RELATED APPLICATIONS

This non-provisional patent application claims priority under 35 U.S.C. §119(a) from Patent Application No. 201120005916.8 filed in The People's Republic of China on Jan. 6, 2011.

FIELD OF THE INVENTION

The present invention relates to electric motors and in particular, to a segmented stator core which allows the motor winding to have a high fill factor.

BACKGROUND OF THE INVENTION

A traditional laminate of a stator core, shown in FIG. 12, usually includes a circular yoke 1 and a number of teeth 2 extending inwards from the yoke 1, with the yoke 1 and the teeth 2 integrally formed. Each tooth 2 cooperates with an adjacent tooth 2 and the yoke 1 to define a slot 3 that is used for receiving a coil. During winding, the shuttle of a winding machine has to run through the slots 3 and, therefore, besides the coil, the slots 3 have to leave space for the shuttle to pass through. This space lowers the fill factor of the stator core thus reducing the efficiency of the motor employing this type of stator core.

SUMMARY OF THE INVENTION

The present invention aims to provide a motor stator which can solve the above mentioned problems. This is achieved by providing a motor stator including a number of separate core segments, each of which can be wound before assembly, and a fixing ring that is fixed to the outer surface of every core segment so that the core segments are assembled into a substantially circular stator core.

Accordingly, in one aspect thereof, the present invention provides a motor stator, comprising: a plurality of separate core segments, each core segment comprising a yoke section and a tooth extending from the yoke section, the yoke sections being connected to form a substantially circular yoke; a plurality of coils, each coil being wound around a corresponding tooth; and a fixing ring fixed to the outer surface of the yoke by a plurality of welds between the fixing ring and the yoke.

Preferably, each yoke section comprises two flat connecting surfaces formed at opposing sides thereof for connecting adjacent yoke sections.

Preferably, the yoke further comprises a plurality of engaging structures at interfaces between adjacent core segments, each engaging structure comprising a convex part formed from one of two adjacent yoke sections and a concave part formed at the other of the two adjacent yoke sections, the convex part being engaged with the concave part.

Preferably, the welds between the fixing ring and the yoke are located at interfaces between adjacent core segments.

Alternatively, the welds between the fixing ring and the yoke are spaced from interfaces between adjacent core segments.

Preferably, the fixing ring is C-shaped and has two ends in a circumferential direction thereof.

Preferably, the fixing ring is welded to the outer surface of the yoke at opposite axial ends thereof.

Preferably, the fixing ring has a plurality of notches in opposite axial ends thereof, each notch corresponds to a respective core segment, and the fixing ring is welded to the yoke at the notches.

Preferably, the notches are spaced from interfaces between adjacent core segments.

Preferably, the fixing ring has a plurality of openings, each opening having two opposing sides which are spaced from each other along the circumference of the fixing ring and welded to the outer surface of the yoke.

Preferably, each opening corresponds to a respective core segment in a radial direction of the fixing ring.

According to a second aspect thereof, the present invention provides a motor stator comprising: a plurality of separate core segments, each core segment comprising a yoke section and a tooth extending from the yoke section, the yoke sections being connected to form a substantially circular yoke; a plurality of coils, each coil being wound around a corresponding tooth; and a fixing ring made of plastic, the fixing ring comprising two abutting rings extending inwardly from opposite axial ends thereof, the yoke being sandwiched between the two abutting rings.

Preferably, the fixing ring is overmolded onto the yoke.

Alternatively, the fixing ring comprises two parts each having one of the two abutting rings, an interface between the two parts being welded together.

In the embodiments of the present invention, as the core segment is separate from each other during winding, the coil can be wound to a degree that can fill the slot defined by two adjacent core segments. Therefore, compared to traditional motor stator, the fill factor of the present invention is higher.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
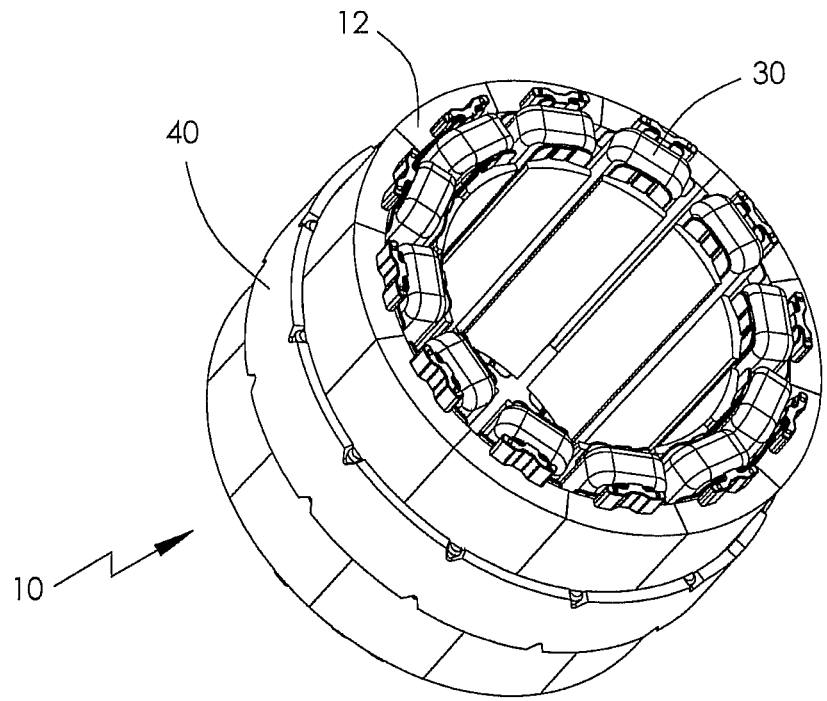
FIG. 1 illustrates a motor stator in accordance with a first embodiment of the present invention, including a number of core segments, a number of coils wound around the core segments and a fixing ring assembling the core segments to a core.
Figure 2:
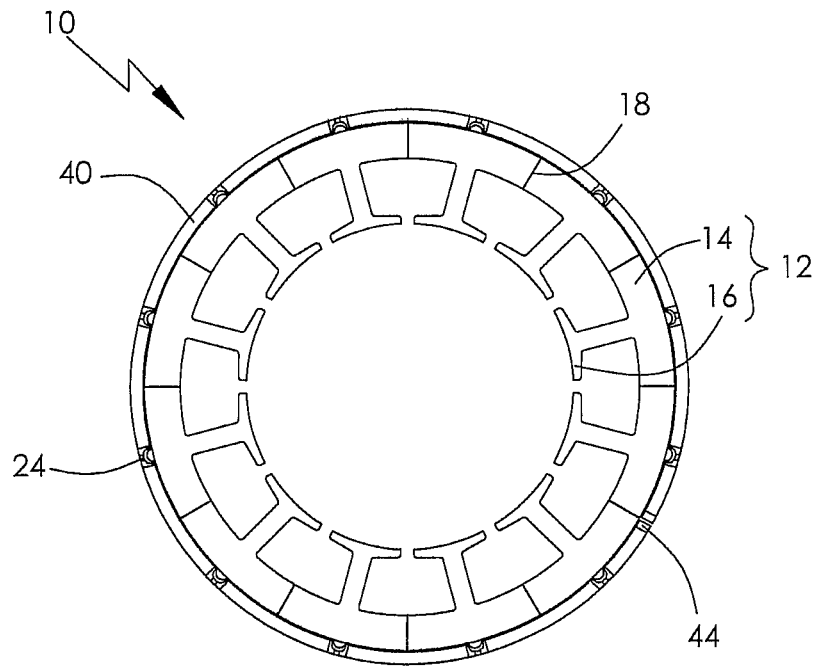
FIG. 2 is a plan view of the motor stator of FIG. 1, with the coils removed.
Figure 3:
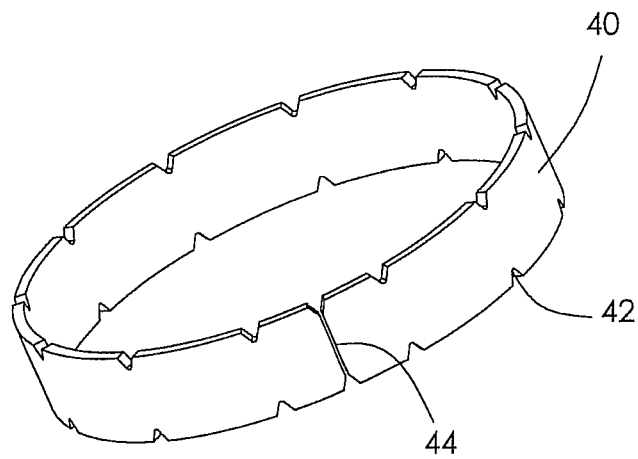
FIG. 3 shows the fixing ring of FIG. 1.
Figure 4:
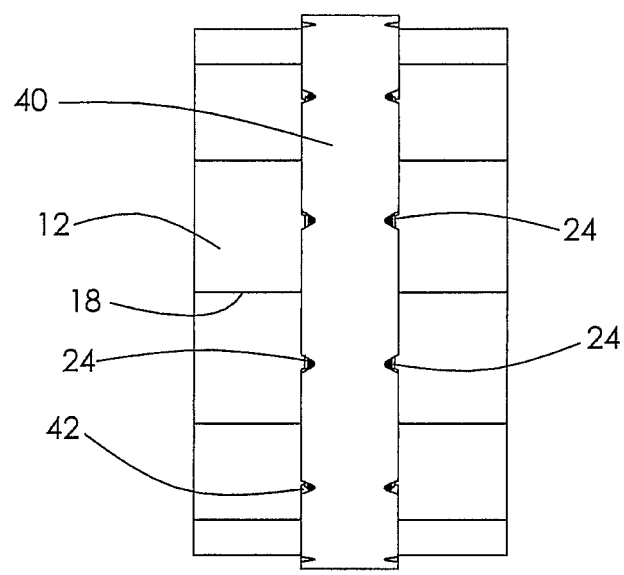
FIG. 4 is a side view of the motor stator of FIG. 1, with the coils removed.

Referring to FIGS. 1 to 4, a motor stator of a brushless motor or a servo motor, according to a first embodiment of the present invention, includes a substantially circular core 10, a number of coils 30 wound around the core 10, and a fixing ring 40 fixed around the outer surface of the core 10.

The core 10 is made of magnetic material, such as soft iron or silicon steel, and includes a number of core segments 12. Each core segment 12 can be made by stacking a number of laminates and includes a yoke section 14 and a tooth 16 extending from the yoke 14. Each yoke 14 includes two planar contact surfaces 18 on two opposing sides thereof for contacting adjacent yokes 14. The fixing ring 40 is made of metal and is substantially ring-shaped, including two ends 44 that is use are connected to each other. The fixing ring 40 has a number of notches or notches 42 in each edge thereof for ease of welding, each of which corresponds to a respective core segment 12. Preferably, the length of the fixing ring 40 in the axial direction of the motor stator is less than that of the core 10 to save material.

In assembly, each coil 30 is wound around a corresponding tooth 16. The contact surfaces 18 are connected together by surrounding the core segments 12 around a shaft (not shown) for example, so that the yoke sections 14 form the circular yoke of the core 10, while the teeth 16 extend inwards from the yoke. The fixing ring 40 is clamped to the outer surface of the core segments 12 and the two ends 44 are welded together. The fixing ring 40 is then connected to the every core segment 12 by welding at the notches 42. Thus a weld 24 at each notch and at the ends of the ring fix the ring to the individual yoke sections 14 to rigidly form the circular yoke. Each notch 42 is offset from the position where two adjacent core segments 12 make contact, namely the contact surface 18. Finally, the shaft is removed and the assembly is finished.

In other embodiments, the fixing ring 40 can be made without ends 44, such that the fixing ring 40 is a closed or continuous ring. In this situation, during assembly, the fixing ring 40 can be heated before assembly and cooled down after surrounding the core 12 to ease assembly of the fixing ring to the stator core by thermal expansion of the fixing ring to ease fitting of the ring to the yoke.

It should be understood that a fixing ring without the notches 42, may also be welded to the core 10 along the two edges of the fixing ring 40.

In other embodiments, the fixing ring 40 can be a casing of a motor that employs the motor stator. In this circumstance, the core 10 is fixed in the casing in a tight-fit method, preferable a press fit technique and, therefore, no welding is needed.

Figure 5:
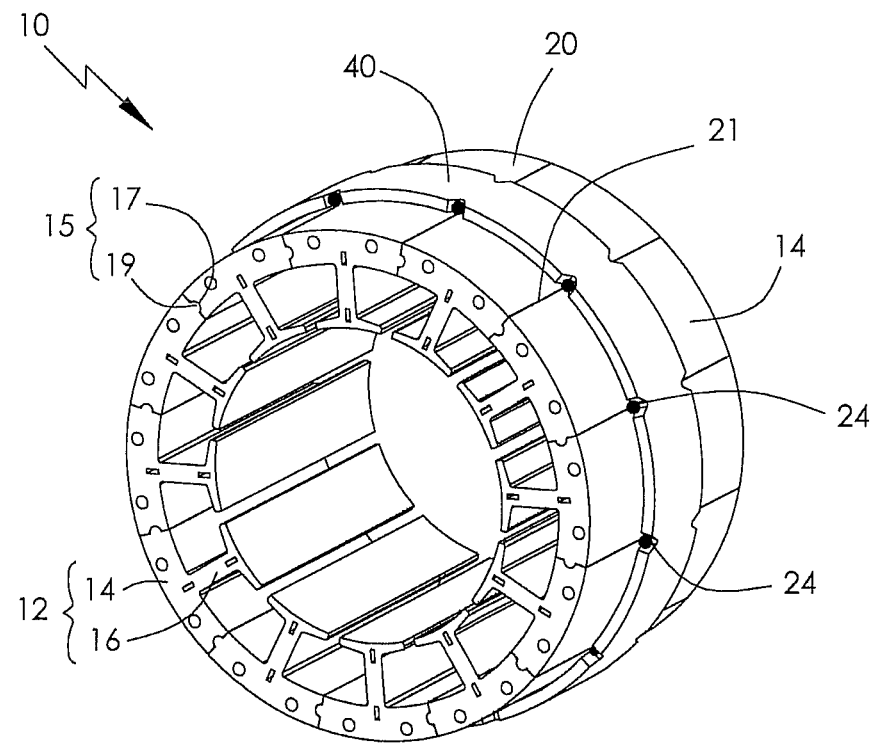
FIG. 5 illustrates a motor stator in accordance with a second embodiment, with the coils removed.
Figure 6:
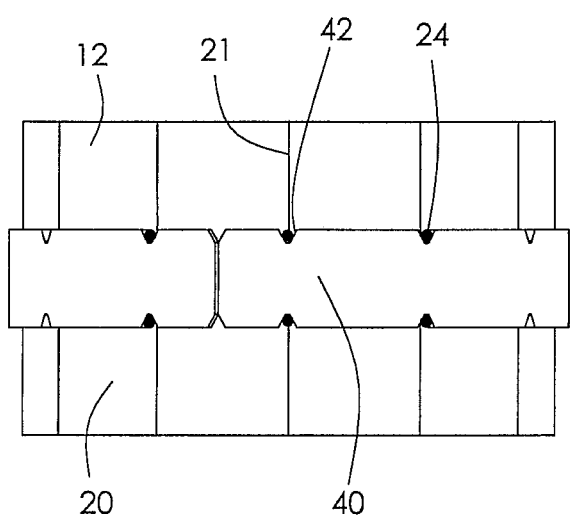
FIG. 6 is a side view of the motor stator of FIG. 5.

FIGS. 5 and 6 show a motor stator according to a second embodiment of the present invention. The motor stator of FIG. 5 differs from that of FIG. 1 by the presence of engaging structures 15 that connect adjacent yoke sections 14, and the position relationship between the fixing ring 40 and the core 20. In detail, each yoke section 14 includes a convex part 19 extending along one contact surface 21 thereof and a concave part 17 formed on the other contact surface 21. The convex part 19 is received in a corresponding concave part 17 for radially aligning two adjacent yoke sections 14. The notch 42, where the fixing ring 40 is welded to the core 20, is located at the connecting surface 21. Thus, when the fixing ring 40 is welded to the core 20 at a notch 42, the two corresponding adjacent yokes 13 are welded together as well.

Figure 7:
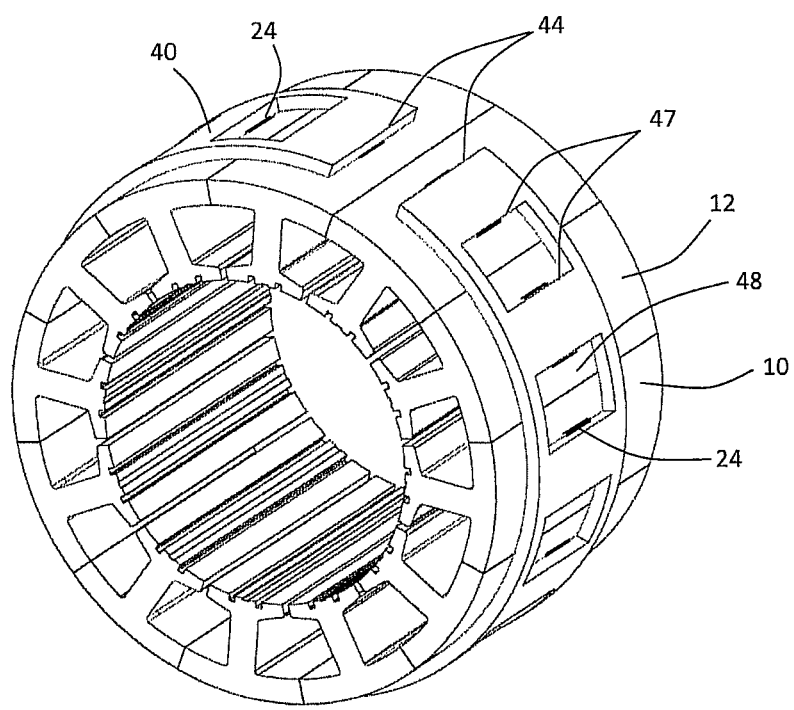
FIG. 7 illustrates a motor stator, according to a third embodiment.
Figure 8:
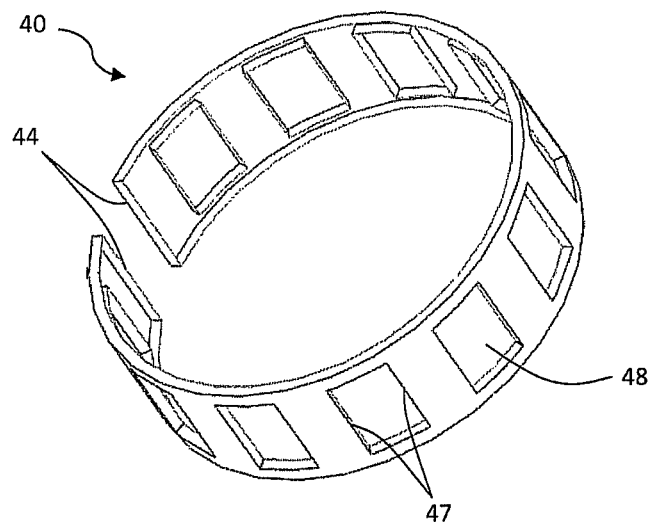
FIG. 8 shows the fixing ring of the motor stator of FIG. 7.

FIGS. 7 and 8 show a motor stator according to a third embodiment of the present invention. The motor stator of FIG. 7 differs from that of FIG. 1 by the presence of a number of rectangular openings 48 formed in the fixing ring 40 for saving weight and the omission of the notches 42 of FIG. 1. Two opposing sides 47 of the opening 48 that extend along the axis of the motor stator and two ends 49 of the fixing ring 40 are welded to the core 10 by welds 24 to fix the fixing ring 4 to the core 10. Preferably, two adjacent core segments 12 are exposed in each opening 48 so that each core segment 12 is fixed to the fixing ring 40 by the welds at the opposing sides 47 of the openings 48 and the two ends 49 of the fixing ring 46.

Figure 9:
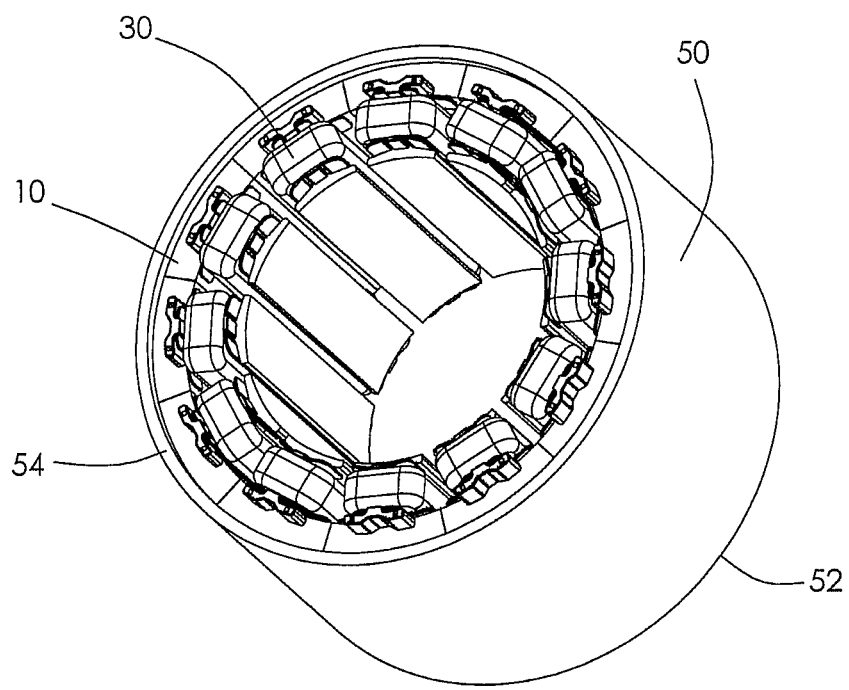
FIG. 9 illustrates a motor stator according to a fourth embodiment.
Figure 10:
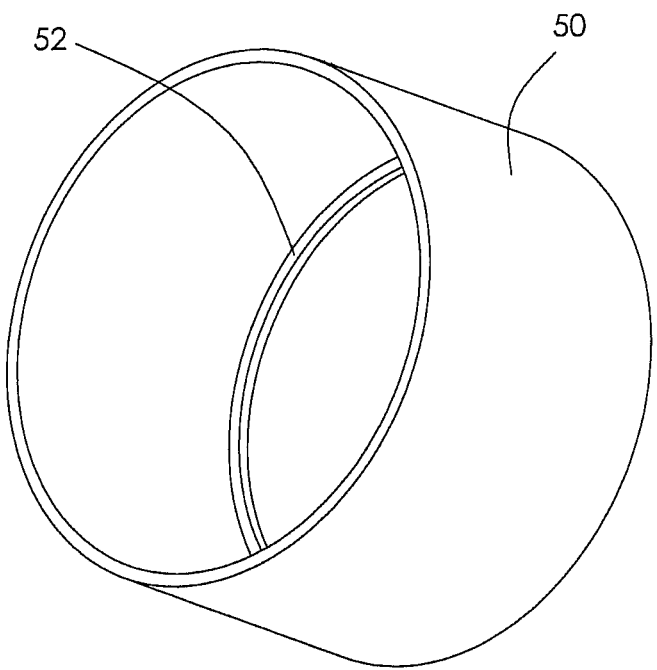
FIG. 10 shows the fixing ring of the motor stator of FIG. 9.

A fourth embodiment of a motor stator according to the present invention, is shown in FIGS. 9 and 10. Compared to the motor stator of FIG. 1, the difference in the motor stator of FIG. 9 is that the fixing ring 50 is made of plastic and the length of the fixing ring 50 in the axial direction of the motor stator is greater than that of the core 10. Before assembly, the fixing ring 50, as shown in FIG. 10, has a first abutting ring 52 extending inwardly from an end thereof. During assembly, the core 10 is put into the fixing ring 50. Then, the other end of the fixing ring 50 is made to form a second abutting ring 54 by ultrasonic treatment. The first and second abutting rings 52 and 54 clamp the core 10 there between.

Figure 11:
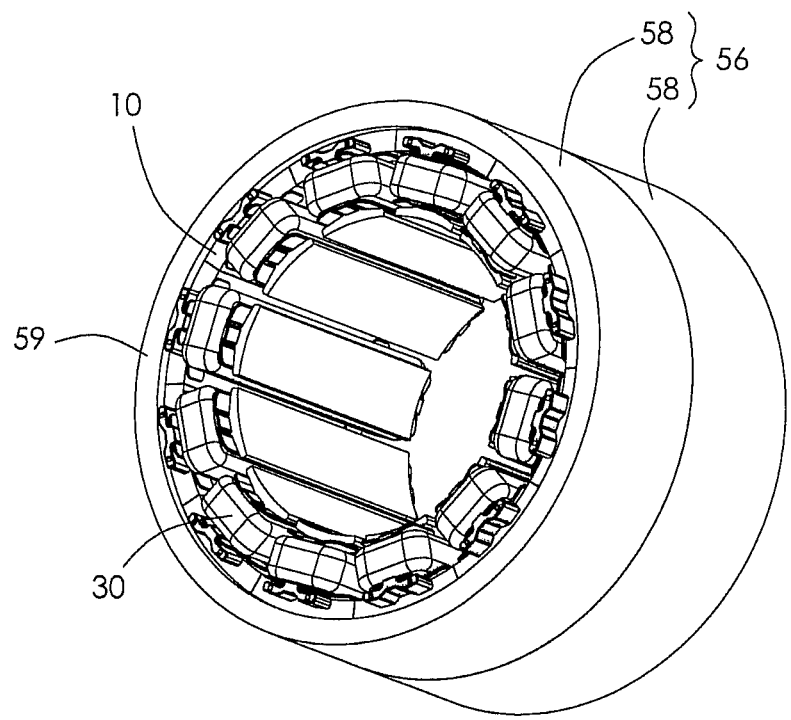
FIG. 11 illustrates a motor stator in accordance with a fifth embodiment.
Figure 12:
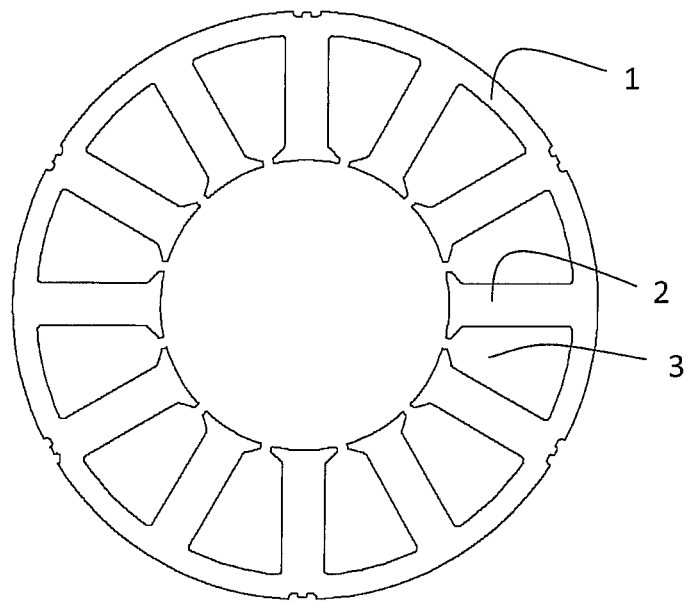
FIG. 12 shows a prior art laminate of a motor stator.

Referring to FIG. 11, a motor stator, according to a fifth embodiment of the present invention, is shown. Compared to the motor stator of FIG. 9, the difference is that the fixing ring 56 is formed in two parts 58, each of which is similar to the fixing ring 50 of FIG. 10, including an abutting ring 59 at just one end thereof, although the axial length of each part is about half the length of the core. The two parts 58 are fitted over respective ends of the core and connected together by ultrasonic treatment, such as ultrasonic plastic welding, to house the core 10 therein. It should be understood that, in other embodiments, the plastic fixing ring can be overmolded onto the core 10.

As the core segments are separate from each other during winding, the coils can be wound to a degree that can more fully fill the slot defined by two adjacent core segments. Therefore, compared to traditional motor stators, the fill factor of the present invention is higher.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

It should be understood that in some embodiments the fixing ring is not a complete circle.

The invention claimed is:

1. A motor stator, comprising:
   a plurality of separate core segments, each core segment comprising a yoke section and a tooth extending from the yoke section, the yoke sections being connected to form a substantially circular yoke;
   a plurality of coils, each coil being wound around a corresponding tooth; and a fixing ring fixed to the outer circumferential surface of the yoke by a plurality of welds between the fixing ring and the outer circumferential surface of the yoke, wherein the fixing ring has a plurality of notches in opposite axial ends thereof and the fixing ring is welded to the yoke at the notches.

2. The motor stator of claim 1, wherein each yoke section comprises two flat connecting surfaces formed at opposing sides thereof for connecting adjacent yoke sections.

3. The motor stator of claim 1, wherein the yoke further comprises a plurality of engaging structures at interfaces between adjacent core segments, each engaging structure comprising a convex part formed from one of two adjacent yoke sections and a concave part formed at the other of the two adjacent yoke sections, the convex part being engaged with the concave part.

4. The motor stator of claim 3, wherein the welds between the fixing ring and the yoke are located at interfaces between adjacent core segments.

5. The motor stator of claim 1, wherein the fixing ring is C-shaped and has two ends in a circumferential direction thereof.

6. The motor stator of claim 1, wherein the welds between the fixing ring and the yoke are spaced from interfaces between adjacent core segments.

7. The motor stator of claim 1, wherein the fixing ring is welded to the outer surface of the yoke at opposite axial ends thereof.

8. The motor stator of claim 1, wherein the welds between the fixing ring and the yoke are located at interfaces between adjacent core segments.

9. The motor stator of claim 1, wherein the fixing ring has an axial length less than that of the yoke.

10. A motor stator, comprising:
a plurality of separate core segments, each core segment comprising a yoke section and a tooth extending from the yoke section, the yoke sections being connected to form a substantially circular yoke;
a plurality of coils, each coil being wound around a corresponding tooth; and
a fixing ring fixed to the outer surface of the yoke by a plurality of welds between the fixing ring and the yoke,
wherein the fixing ring is welded to the outer surface of the yoke at opposite axial ends thereof, and
wherein the fixing ring has a plurality of notches in opposite axial ends thereof, each notch corresponds to a respective core segment, and the fixing ring is welded to the yoke at the notches.

11. The motor stator of claim 10, wherein the notches are spaced from interfaces between adjacent core segments.

12. A motor stator, comprising:
a plurality of separate core segments, each core segment comprising a yoke section and a tooth extending from the yoke section, the yoke sections being connected to form a substantially circular yoke;
a plurality of coils, each coil being wound around a corresponding tooth; and
a fixing ring fixed to the outer circumferential surface of the yoke by a plurality of welds between the fixing ring and the outer circumferential surface of the yoke,
wherein the fixing ring has a plurality of openings, each opening having two opposing sides which are spaced from each other along the circumference of the fixing ring and welded to the outer surface of the yoke at two adjacent yoke sections, the yoke section of each core segment being fixed with the fixing ring by two welds.

13. The motor stator of claim 12, wherein each opening corresponds to a respective core segment in a radial direction of the fixing ring.

* * * * *